INSULATING FERROELECTRIC GATE ADAPTIVE RESISTOR

Filed Sept. 12, 1967

INVENTORS
Walter J. Merz &
Ennio Fatuzzo

BY W. S. Hill
Agent

United States Patent Office 3,463,973

Patented Aug. 26, 1969

3,463,973

INSULATING FERROELECTRIC GATE ADAPTIVE RESISTOR

Ennio Fatuzzo, Savona, Italy, and Walter J. Merz, Zurich, Switzerland, assignors to Radio Corporation of America, a corporation of Delaware Filed Sept. 12, 1967, Ser. No. 667,283
Int. Cl. H01l *11/00, 3/00*
U.S. Cl. 317—235 3 Claims

ABSTRACT OF THE DISCLOSURE

An adaptive resistor of the insulating ferroelectric gate type comprises a body of single crystal ferroelectric insulating material, such as barium titanate, a layer portion of which has been converted to the semiconducting state and which constitutes a current path, electrodes connected to opposite ends of the layer, and a gate electrode attached to the insulating body portion. Resistivity of the semiconductor layer current path is varied by inducing charges of either similar or opposite type to those in a majority in the semiconductor layer. This is accomplished by selective polarization of the ferroelectric gate. Since the semiconducting current path portion and the insulating gate portion are integral parts of the same body, the undesirable effects of interface states are not present.

BACKGROUND OF THE INVENTION

Solid state electronic circuit elements are available as diodes and three-terminal active devices for amplification, generation, and switching, as well as in the form of such classical circuit components as resistors and capacitors. However, it is also desirable to perform other functions which have not previously been performed satisfactorily by solid state devices. In such a category fall those functions which require the device to adapt its characteristics in response to such inputs as voltage or current.

A device having an electrical resistance, which is adaptable over a sizeable range, by the application of a short duration electrical "setting" signal, is currently of interest for applications such as memory, storage, counting and switching circuitry. A more specific application is an "all-electronic" tuning of TV receivers. Such a device, with a sufficiently large number of stable states, can be applied through a suitable loading circuit to a voltage-dependent capacitance for selection of various frequencies, or to a voltage-dependent gain circuit for volume control in a home instrument or other apparatus.

Adaptable resistors can also provide a storage capacity. Once the resistor is placed in the desired state, all power may be turned off. When read-out is desired, voltage is applied to the proper electrodes and non-destructive read-out is achieved.

A number of approaches have previously been made to the problem of providing adaptive devices. One of these was the Flexode, which utilized field-induced motion of ions in a solid in switching from a diode state to a resistance state. However, the ion motion is too slow for many purposes, and the process of ion motion also requires relatively large switching power, which tends to elevate device temperature during the switching process.

Another type of adaptive device employed a ferroelectric crystal substrate and a thin evaporated film of semiconducting material on the substrate to serve as a resistor. The ferroelectric crystal substrate also served as a gate insulator. Source and drain electrodes were connected to the ends of the semiconductor film. Spontaneous polarization of the ferroelectric gate material served to control the density of free charges, and thus the conductivity of the resistor. This device had many desirable properties. It had high resistance ratios of at least 1000 to 1. It was frequency independent up to high frequencies. Its resistance could be adjusted to any intermediate arbitrary value through partial switching to intermediate values of polarization of the ferroelectric material. Its switching time was of the order of microseconds. And it required low switching power of the order of milliwatts. It had the disadvantage, however, that the stored state of the device decayed slowly with time and it was adversely influenced by ambient conditions. Although these electrical instabilities can be dismissed in some circuit applications, it would be desirable to have a device in which they are absent.

OBJECT OF THE INVENTION

It is a principal object of the present invention to provide an improved adaptive solid state electronic circuit element having advantages of previously-known ferroelectric field-effect devices, but having improved stability.

SUMMARY OF THE INVENTION

The present invention comprises an improved, adaptive, solid state electronic device of the insulating ferroelectric gate type which comprises a body of single crystal ferroelectric material, a part of this body constituting an outer layer having semiconducting properties, spaced electrodes connected to the semiconducting layer defining the ends of a current path through the layer, another portion of the body adjacent the current path having insulating properties, and an electrode on the insulating portion for controlling current flow through the current path. The resistance of the device is controlled by varying the polarization of that portion of the ferroelectric body which underlies the gate electrode so that the semiconducting part which constitutes the current path has a greater or lesser number of charges induced therein. The number of charges in the current path determines the resistance to current flow. Stable states of operation are achieved by completely polarizing the ferroelectric positively or negatively, and intermediate states can be obtained with incomplete polarization.

THE DRAWINGS

Figure 1:
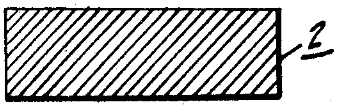
FIGURE 1 is a cross-section view of a body of ferroelectric insulating material suitable for making a device of the present invention.
Figure 2:
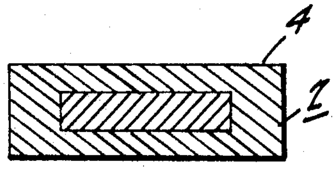
FIGURE 2 is a similar view of the body of FIGURE 1 after an outer portion of it has been converted to semiconducting form.

An example of fabrication of a device in accordance with the invention is as follows. A suitable starting material in making a device of the invention is a single crystal platelet 2 (FIGURE 1) of oxidized insulating barium titanate. Suitable bodies are commercially available although they may not have the geometrical form illustrated. As illustrated in FIGURE 2, an outer shell 4 of the body is reduced to a semiconducting state by heating in a hydrogen atmosphere at a temperature of 500° to 900° C. for from one to several hours. This is believed to produce a form of the material having oxygen vacancies. The outer shell is N-type semiconducting. Visible evidence of the reduction is a change of color from pale yellow to dark brown. Other methods of reduction may also be used.

Figure 3:
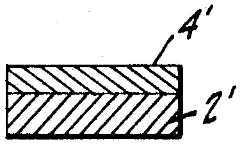
FIGURE 3 is a section view of the body of FIGURE 2 after certain portions have been removed.

As shown in FIGURE 3, all of the outer semiconducting shell 4 of the body is removed, except a top layer portion 4′, by any suitable process such as grinding, or masking and etching with phosphoric acid, leaving a composite body made up of part of the original insulating material represented by a layer 2′ and the layer of semiconducting material 4′.

Figure 4:
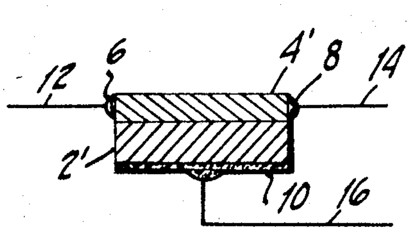
FIGURE 4 is a view of the body of FIGURE 1, with electrodes applied to provide an operating device.

As shown in FIGURE 4, electrodes 6 and 8 are then applied to opposite ends of the layer 4′. This can be accomplished by depositing films of magnesium on opposite ends of the layer 4′, covering the films of magnesium with films of gold and then sintering at about 400° C. in a neutral atmosphere, for example nitrogen. However, other metals may also be used.

Again, by suitable conventional masking techniques, a gate electrode 10, in the form of a thin film of gold, is deposited by evaporation on the bottom exposed surface of the insulating layer 2′.

Electrical lead wires 12 and 14 are then attached, as by soldering, to the metal layers 6 and 8, and another lead wire 16 is soldered to the layer 10.

The portion of the layer 4′ between the end electrodes 6 and 8 functions as the current path of the device. By increasing the number of majority charge carriers in this current path, the resistance of the current path is decreased and the amount of current carried in response to a given difference in potential between the two end electrodes is correspondingly increased. As the number of charge carriers in the current path or channel is decreased, resistance of the path is increased and the current-carrying capacity is reduced.

Figure 5:
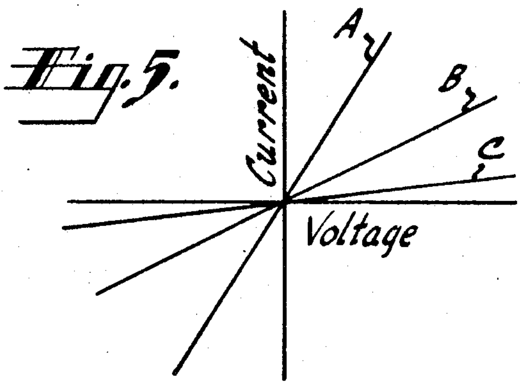
FIGURE 5 is a family of current-voltage curves applicable to the device of FIGURE 4.

In operating the device which has been described, for example, if a positive pulse of sufficient magnitude to completely switch the ferroelectric is applied to the gate electrode 10, the device will be switched to its maximum "ON" state and have a current-voltage characteristic as shown by Curve A of FIGURE 5. As the potential between the source and drain electrodes is increased, increased current flows in the resistor. If a voltage pulse of sufficient magnitude of the opposite polarity is then applied, the ferroelectric body portion 2′ is polarized in the opposite direction so that + charges are induced in the channel portion of layer 4′ and the device is switched to its maximum "OFF" state with the characteristic shown by Curve C of FIGURE 5.

If voltage pulses of magnitude of less than that required to completely switch the ferroelectric are applied to the gate electrode 10, intermediate states are achieved as indicated by Curve B of FIGURE 5.

The device of the present invention uses a single material of continuous crystalline structure for both the ferroelectric and semiconducting portions. The device structure eliminates the states which formerly existed at the interface between the semiconductor and the ferroelectric.

Although the invention has been illustrated using barium titanate as the material for both ferroelectric and semiconductor, other well-known ferroelectric materials can be used, such, for example, as other materials of the perovskite oxide type.

What is claimed is:

1. An adaptive semiconductor resistor of the insulating ferroelectric gate type comprising:
   (a) a single crystal ferroelectric body,
   (b) a layer of said body having semiconducting properties,
   (c) spaced electrodes connected to said layer defining the ends of a current path through said layer,
   (d) another portion of said body adjacent said current path having insulating properties, and
   (e) an electrode on said insulating portion overlying said current path between said spaced electrodes, for controlling current flow through said current path.

2. A device according to claim 1 in which said body is a flat platelet and said layers are substantially coextensive.

3. A device according to claim 1 in which said ferroelectric body is composed of barium titanate.

References Cited

UNITED STATES PATENTS

| | | | |
|---|---|---|---|
| 3,426,255 | 2/1969 | Heywong | 317—235 |
| 3,426,251 | 2/1969 | Prokopowicz | 317—230 |
| 2,791,758 | 5/1957 | Looney | 340—173 |
| 2,791,759 | 5/1957 | Brown | 340—173 |
| 2,791,760 | 5/1957 | Ross | 340—173 |
| 2,791,761 | 5/1957 | Morton | 340—173 |

JOHN W. HUCKERT, Primary Examiner

M. EDLOW, Assistant Examiner

U.S. Cl. X.R.

317—234, 237, 238